United States Patent [19]
Bentley

[11] 3,762,375
[45] Oct. 2, 1973

[54] ROTARY VANE INTERNAL COMBUSTION ENGINE

[76] Inventor: Arthur P. Bentley, Box 139, Boerne, Tex. 78006

[22] Filed: Jan. 24, 1972

[21] Appl. No.: 220,293

[52] U.S. Cl. ............... 123/8.31, 123/8.35, 123/8.13
[51] Int. Cl. .......................................... F02b 53/08
[58] Field of Search ................ 123/8.35, 8.13, 8.45, 123/8.09

[56] References Cited
UNITED STATES PATENTS

| | | | |
|---|---|---|---|
| 3,121,421 | 2/1964 | Peterson | 123/8.31 |
| 3,712,274 | 1/1973 | Craft | 123/8.49 |
| 1,829,391 | 10/1931 | Bullington | 123/8.13 |
| 1,217,733 | 2/1917 | Femons | 123/8.35 X |
| 2,263,275 | 11/1941 | Pieper | 123/8.35 X |
| 3,568,645 | 3/1971 | Grimm | 123/8.45 |

*Primary Examiner*—Clarence R. Gordon
*Attorney*—Schellin & Hoffman

[57] ABSTRACT

This specification discloses a rotary vane internal combustion engine comprising a casing defining a rotor chamber of a shape resembling an ellipse. A shaft is journalled in the casing centrally thereof and driveably mounted on the shaft is a rotor presenting a cylindrical surface. The rotor is formed with a plurality of radial slots and slideably in each slot is a vane. The rotor is also formed with a plurality of combustion chambers opening onto its cylindrical surface. The number of combustion chambers is the same as the numbers of slots with a chamber being located between two adjacent slots.

An intake port for an air, gas, oil mixture is formed in the casing and communicating with this port are a pair of channels formed in the casing on opposite sides of the rotor chamber. These channels pass about the shaft where it is journalled in the casing and open onto the rotor chamber at points diametrically opposite to the intake port. A manifold type exhaust is formed in the casing about 30° in the direction of rotation of the rotor from the intake port.

A spark plug is mounted on the casing with its points located at the periphery of the rotor chamber. Conductors extend from the spark plug to contacts mounted on the exterior of the casing with the contacts being bridged at periodic intervals by a cam driveably mounted on the shaft. The shaft also driveably carries a gear with which meshes a pinion that is driven by a starting motor.

9 Claims, 5 Drawing Figures

PATENTED OCT 2 1973 3,762,375

ROTARY VANE INTERNAL COMBUSTION ENGINE

The present invention relates to rotary vane internal combustion engines and is concerned primarily with an engine having improved combustion chambers and new and improved means for conducting a mixture of air, fuel and oil from an intake port about a rotor carrying shaft and to a rotor chamber.

BACKGROUND OF THE INVENTION

At the present time rotary vane internal combustion engines are known. However known engines of this type have certain undesirable features which are intended to be obviated by the present invention.

It may be stated as a general rule that in most of the known engines of this type the vanes are moved outwardly by springs. Also it is known to form combustion chambers in the cylindrical surface of the rotor which are in the nature of small pockets. While centrifugal force is always a factor tending to move the vanes outwardly there is no known engine in which this centrifugal force is supplemented by expanding gasses generated in the combustion chambers.

In an engine of the subject type it is desirable to utilize a mixture of air, fuel and oil which supplies the gas that is consumed by combustion and lubricates the bearings in which the rotor shaft is journalled. It is desireable that this mixture be heated as it is introduced into the engine and at the same time the rotor be cooled thereby.

OBJECTS OF THE INVENTION

With the foregoing conditions in mind the present invention has in view the following objectives:

1. To provide a rotary vane internal combustion engine in which the rotor is formed with combustion chambers opening onto its cylindrical surface and slots in which vanes are slideably received with provision for using expanding gases from the combustion chambers to supplement centrifugal force in moving the vanes outwardly.

2. To provide, in an engine of the type noted, a passage between an end wall of a combustion chamber and the slot adjacent thereto, and the vane in the slot with a lateral passage which communicates with the passage aforesaid when the vane is in a retracted position with the vane having a radial expansion chamber which communicates with said lateral passage.

3. To provide, in an engine of the kind described, a rotor having radial slots each receiving a vane, with a radial guide stem in each slot extending into the expansion chamber of the vane in that slot and constituting an end closure for the expansion chamber.

4. To provide, in an engine of the character noted, a casing including a rotor chamber with side walls, a shaft journalled in the side walls and an intake port which receives a mixture of air, fuel, and oil with channels extending from said port through said side walls, about said shaft and opening into said rotor chamber at points diametrically opposite to said intake port.

5. To provide, in an engine of the type described, a spark plug that is mounted on the casing, a cam driveably mounted on the shaft, contacts which are closed by the cam as the shaft rotates, and conductors between said contacts and the spark plug.

6. To provide, in an engine of the kind aforesaid, a starter motor that is operatively connected to the shaft, and 7. To provide, in an engine of the character described, an exhaust of the manifold type which is angularly spaced from the intake port.

Various other more detailed objects and advantages of the invention will in part become apparent and in part be hereinafter stated as the description of the invention proceeds.

SUMMARY OF THE INVENTION

The foregoing objects are achieved by providing a rotary vane internal combustion engine comprising a casing having side walls and a surface which resembles an ellipse in shape with said walls and surface defining a rotor chamber. A shaft is journalled in said side walls centrally of the rotor chamber and keyed to this shaft is a rotor having side faces in sliding engagement with said side walls and cylindrical surface. A plurality of radial slots open onto the cylindrical surface and the latter is formed with a combustion chamber between each pair of slots. A passage is formed in the rotor between an end of each combustion chamber and the adjacent slot. A radial guide stem is mounted on the rotor in each slot.

A vane is slideable in each slot and has a radial expansion chamber, the inner end of which receives and is closed by a guide stem. A lateral passage extends from the expansion chamber and aligns with a passage in the rotor when the vane is in a retracted position.

The casing is formed with an intake port for an air, fuel, oil mixture. A channel or duct is formed in each side wall of the casing and extends from the intake port about the shaft and to a point diametrically opposite to the intake port where it opens onto the rotor chamber. The casing is formed with a manifold type exhaust at an annular distance of about 30° from the intake port in the direction of rotation of the rotor.

A spark plug is mounted on the casing and is connected to contacts which are closed by a cam on the shaft. A starting motor is operatively connected to the shaft.

For a full and more complete understanding of the invention reference may be had to the following description and accompanying drawings wherein.

Figure 1:
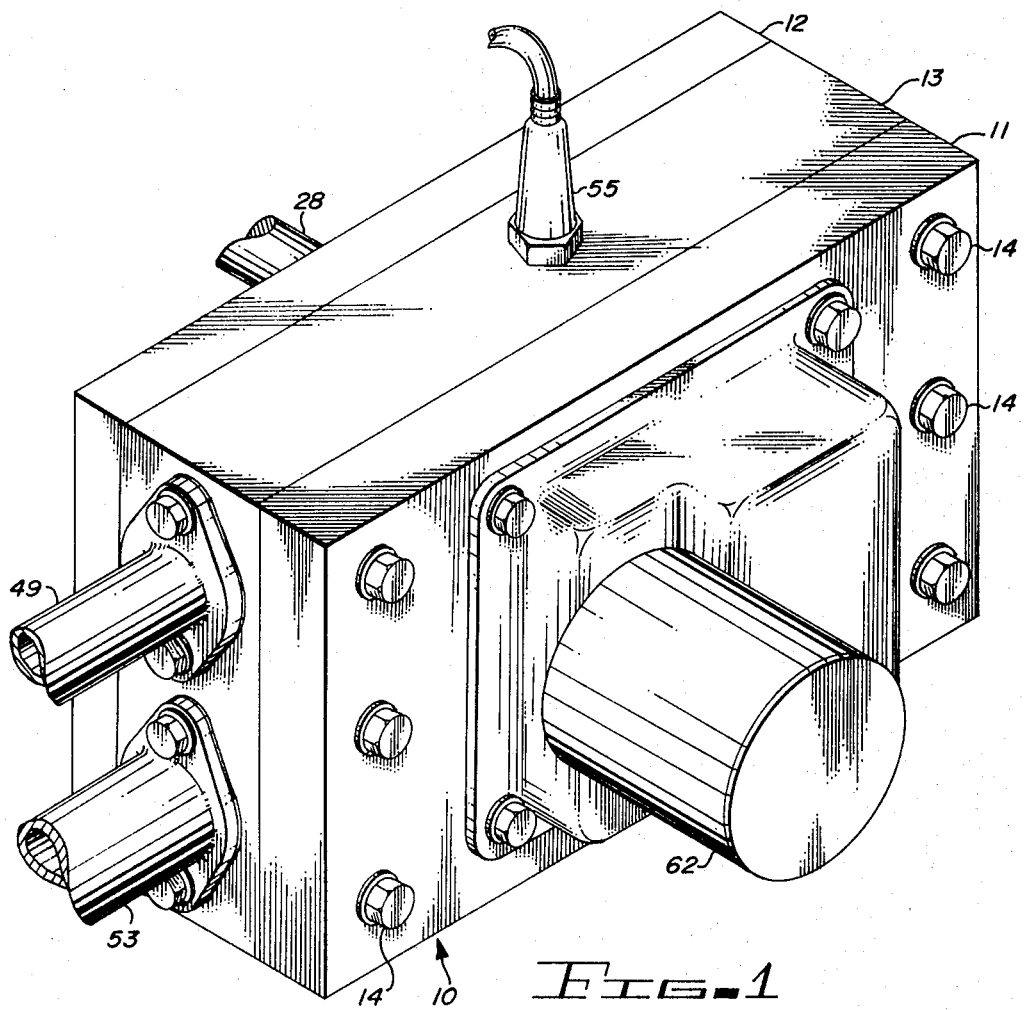
FIG. 1 is a perspective of a rotary vane internal combustion engine embodying the precepts of the present invention.
Figure 2:
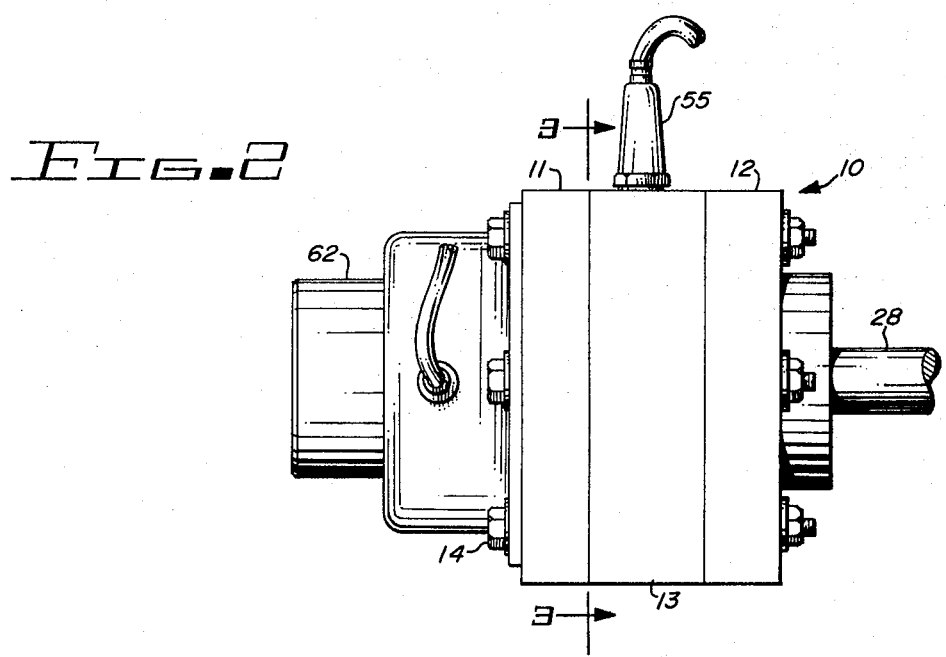
FIG. 2 is an end elevation of the engine of FIG. 1.

Referring now to the drawings and first more particularly to FIGS. 1 and 2 a casing is identified in its entirety at 10 and comprises side walls 11 and 12 and an engine block 13 which is clamped between walls 11 and 12 by bolts 14. Block 13 is formed with an opening defined by a surface 16 (FIG. 3) which is of an oval shape resembling an ellipse. This surface 16, together with walls 11 and 12 define a rotor chamber 17 having an enlarged central portion defined by opposed segments of a cylindrical surface and end lobes.

Figure 4:
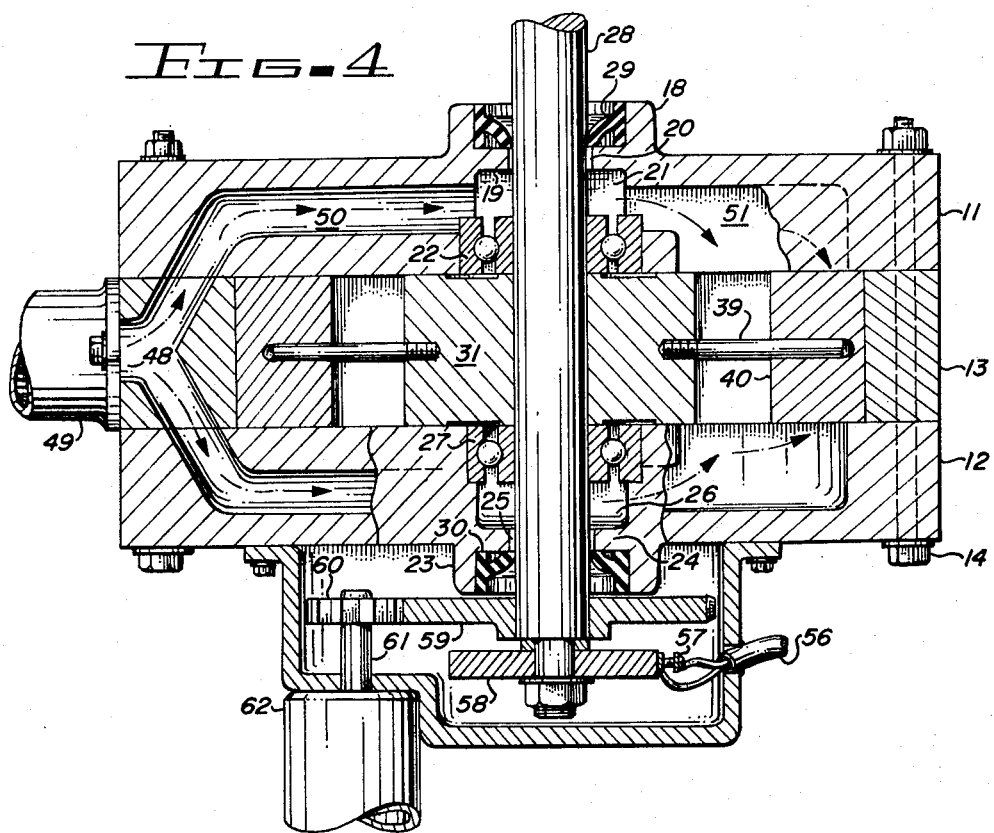
FIG. 4 is a section taken on the plane of the line 4—4 of FIG. 3.

Referring now to FIG. 4 wall 11 is formed with a nipple 18 the bottom of which is closed by an annular flange 19 presenting an opening 20. Inwardly of flange 19 is a recess 21 which is continued to the inner face of wall 11. Mounted in recess 21 adjacent to the inner face of wall 11 and spaced from flange 19 is a bearing assembly 22. Wall 12 is also formed with a nipple 23, flange 24 presenting an opening 25, a recess 26 and a bearing assembly 27. These elements are the counterparts of elements 18 through 22 formed in and carried by wall 11.

Figure 3:
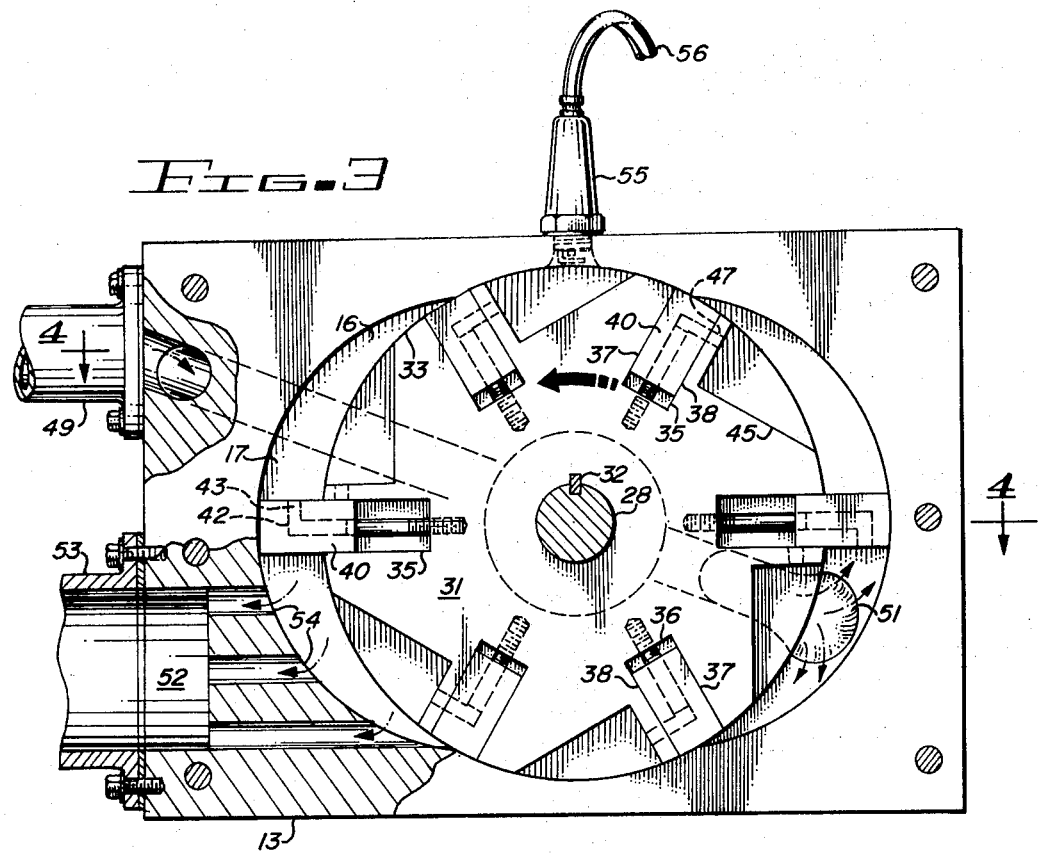
FIG. 3 is a transverse section taken on the plane of the line 3—3 of FIG. 2.

A shaft 28 passes through openings 20 and 25, recesses 21 and 26 and driveably carries the inner races of bearing assemblies 22 and 27. Oil seals 29 and 30 in nipples 18 and 23 seal shaft 28 relative to walls 11 and 12. As shown in FIG. 3 a rotor 31 is driveably mounted on shaft 28 by a key 32. Rotor 31 includes a cylindrical surface 33 and side faces which slideably engage the inner faces of walls 11 and 12. Cylindrical surface 33 is of substantially the same curvature as the segmental cylindrical surfaces at the central portions of surface 16.

Rotor 31 is formed within a plurality of radial slots 35. In the embodiment illustrated there are six of these slots 35 but this number is not to be considered a limitation on the invention. Each slot 35 is defined by an inner or bottom surface 36 and flat side faces 37 and 38. Slots 35 extend the entire thickness of rotor 31 between the side faces thereof as shown in FIG. 4. Secured to rotor 31 at the bottom surface 36 of each slot 35 is a guide stem 39 which is located midway of side faces 37 and 38.

A vane 40 is slideably received in each slot 35. Each vane 40 is formed with a radial expansion chamber 41 (FIG. 5) the outer end of which is closed as indicated at 42 with the inner end snugly receiving a guide stem 39 which closes this end of chamber 41. A lateral passage 43 extends from chamber 41 to a side face of the vane.

Figure 5:
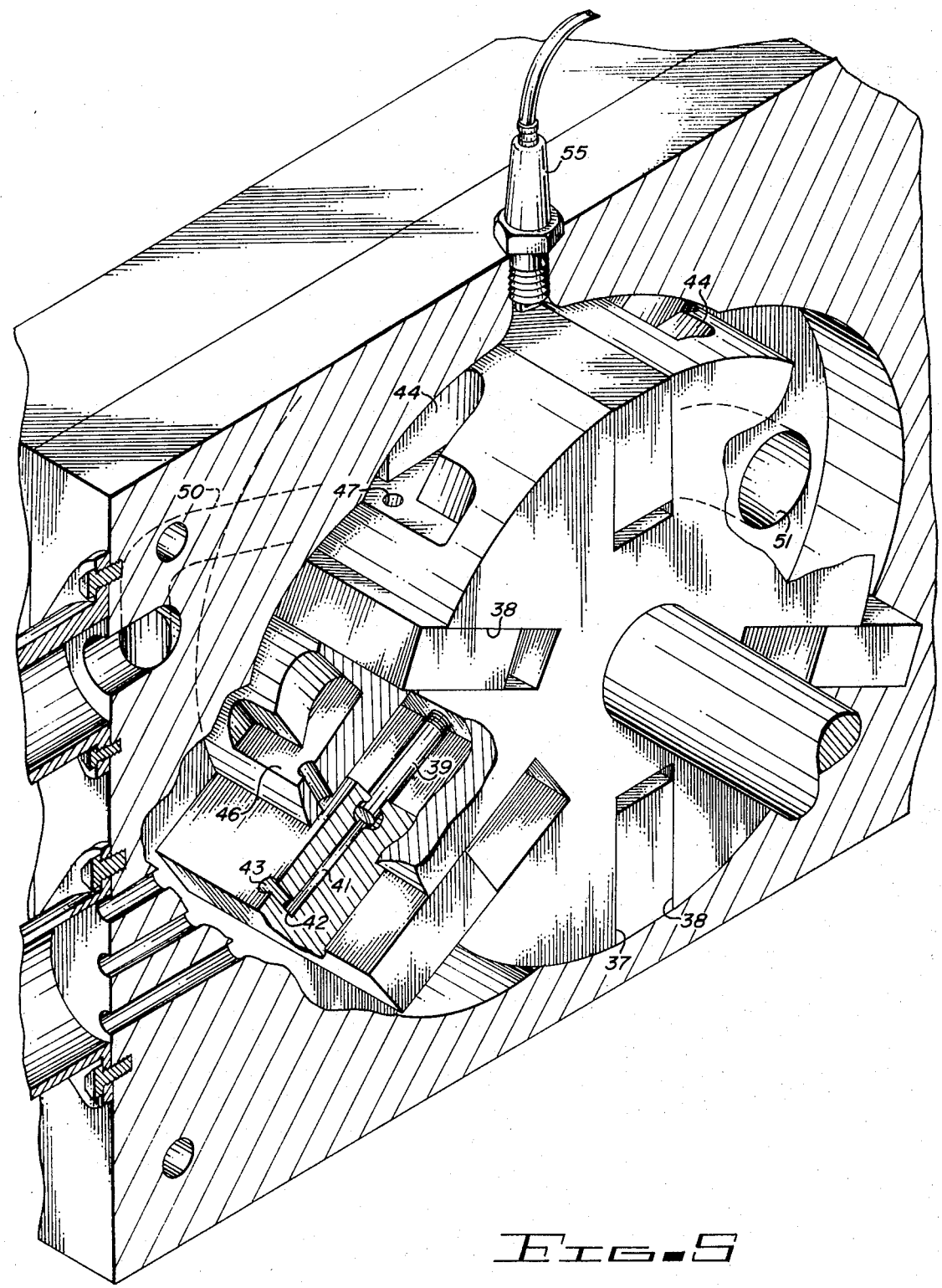
FIG. 5 is a perspective with portions of the casing broken away.

Formed in rotor 31 and opening onto its cylindrical surface 33 are a plurality of combustion chambers or pockets 44 (FIG. 3 and 5). Pockets 44 correspond in number to the number of slots 35 with a pocket being located between each pair of slots 35. Each combustion chamber 44 has an inclined bottom surface 45, as shown more clearly in FIG. 3 and an end surface 46 which is more closely adjacent to side surface 38 of the adjacent slot 35. When a vane 40 is in a fully retracted position passage 47 aligns with lateral passage 43 in the vane.

Combustion chambers 44 are of T shape with the cross-head of the T being at end surface 46 and the stem terminating at the cylindrical surface 33 of rotor 31. These chambers 44 are formed entirely within rotor 31 and do not extend to the side faces thereof.

Referring now to FIGS. 3 and 4 an intake port is shown at 48 as formed in block 13. A conduit 49 passes a mixture of air, fuel, and oil to port 48. Port 48 is of Y shape with each leg of the Y opening onto a face of block 13. Each side wall 11 and 12 is formed with a channel or duct 50 one end of which opens onto a face of the wall where it connects with a leg of Y port 48. The other end of channel 50 opens onto recess 21 or recess 26, depending on the wall 11 or 12 in which it is formed. From a point substantially diametrically opposite to where one of channels 50 is connected to recess 21 or 26 a channel 51 which is of greater cross-sectional area than channel 50 extends to a point where it opens onto rotor chamber 17 beyond rotor 31. Thus the air, fuel, oil mixture is delivered from intake port 48 to recesses 21 and 26 where it lubricates bearings 22 and 27 and thence to rotor chamber 17 outside of rotor 31 where it is compressed and forced into pockets 44 with a high degree of pressure.

As shown in FIG. 3 block 13 is formed with an exhaust port 52 to which is connected an exhaust pipe 53. Port 52 is quite large and extending therefrom through block 13 to surface 16 are a plurality of small exhaust passages 54, which together with port 52 constitute a manifold type exhaust. This exhaust, considered as an entirety is spaced about 30° in the direction of rotation of rotor 31 from intake port 48.

A spark plug 55 is mounted on block 13 with its points being located substantially at surface 16 of block 13. A cable 56 including the usual conductors extend to contacts 57 (FIG. 4). A cam 58 is driveably mounted on shaft 28 and is formed with the required number of cam surfaces or lands to close contacts 57 for each combustion chamber 44 on each revolution of shaft 28.

Driveably mounted on shaft 28 externally of wall 12 is a gear 59. Meshing with gear 59 is a pinion 60 carried by the drive shaft 61 of a starter motor 62.

OPERATION

While the manner in which the subject engine operates is believed to be obvious from the illustration of the drawings and description of parts set forth above it is briefly described as follows:

It will be understood that the mixture of air, fuel and oil as it passes from intake port 48 through channels 50 and 51 is heated by the heat derived from the combustion of the fuel in the combustion chambers. At the same time the block and rotor are cooled by the interchange of heat. Also that bearings 22 and 27 are lubricated by the oil content of the mixture.

The engine is started by imparting initial rotation to shaft 28 by starter motor 62 in a well known manner.

Vanes 40 will normally be urged radially outwardly by centrifugal force. Thus as the air fuel mixture is delivered by channels 51 to rotor chamber 17 outside of rotor 31 it is compressed by the counterclockwise rotation of the rotor, (speaking with reference to the showing of FIG. 3) and the converging relation of surfaces 16 and 33. This compressed mixture is forced into combustion chambers 44.

Cam 58 and contacts 57 are timed so that a spark occurs just before a pocket 44 reaches what might be called dead center, that is just before the gas therein is under maximum compression. When the spark ignites the mixture in a chamber 44 the vane 40 immediately in advance thereof is fully retracted, also in this position passages 43 and 47 align. Thus as combustion occurs gasses are passed through these aligned passages into the expansion chamber 41 of the vane. As the inner end of chamber 41 is closed by a stem 39 the expanding gasses will force the vane radially outwardly and maintain its outer end surface in contact with surface 16 of block 13. This insures of efficient delivery of the spent gasses to exhaust port 52.

Rotor 31 rotates in a counterclockwise direction, speaking with reference to the illustration of FIG. 3, and when a vane 40 arrives at the rear end of the segmental cylindrical surface adjacent to spark plug 55, the gases in front of this vane will be under maximum compression. Thus, ignition of gases in the combustion chamber 44 in advance of this vane occurs while the gases are under maximum compression. At this time, the outer end of inclined bottom 45 of this combustion chamber is in engagement with the segmental cylindrical surface of block 13. Thus, all the force generated by the expanding gases is effective on end surface 46 of this chamber 44 to rotate rotor 31 with, the gases reacting against surface 16 of block 13 which is fixed.

While a preferred embodiment of the invention is hereinbefore set forth it is to be clearly understood that the invention is not to be limited to the exact constructions, mechanisms and particular number of certain elements illustrated and described because various modifications of these details may be provided in putting the invention into practice.

What is claimed is:

1. In a rotary vane internal combustion engine,
   a. a casing comprising a pair of side walls with an engine block clamped therebetween, said walls having flat inner faces and said block being formed with an opening of oval configuration which together with said inner faces define a rotor chamber;
   b. a shaft journalled in said side walls centrally of said rotor chamber;
   c. a rotor keyed to said shaft and having flat side faces slidably engaging the inner faces of said side walls and a cylindrical surface;
   d. a plurality of radial slots in said rotor which are angularly spaced and open onto said cylindrical surface, each of said slots having flat side faces and a bottom;
   e. a vane slidable in each of said slots and formed with an expansion chamber terminating at its outer end in a lateral passage in the vane which communicates with the expansion chamber in the vane;
   f. a plurality of combustion chambers formed in said rotor corresponding in number to the number of slots formed in said rotor between the side faces of the rotor with each combustion chamber being disposed between a pair of adjacent slots and opening onto said cylindrical surface, each of said combustion chambers having an end surface adjacent to a side surface of a slot and an inclined bottom terminating at said cylindrical surface;
   g. a passage extending from said end surface to a side surface of the adjacent slot, said passage aligning with the lateral passage in the vane in said adjacent slot when said vane is retracted in said slot;
   h. an intake port in said block;
   i. channels in said side walls connecting between said intake port and said rotor chamber at points diametrically opposite to said intake port and beyond said rotor;
   j. an exhaust port angularly spaced from said intake port;
   k. a spark plug on said block;
   l. contacts connected to said spark plug, and
   m. a cam driveably mounted on said shaft in operative relation to said contacts.

2. The engine of claim 1 in which there is a radial guide stem mounted on the rotor at the bottom of each slot therein and extending into the expansion chamber in the vane in that slot.

3. The engine of claim 1 in which each of said combustion chambers is T shaped with the cross head of the T at the end surface of that chamber and the stem of the T terminating at the cylindrical surface of the rotor.

4. The engine of claim 1 together with bearing assemblies between said shaft and side walls and in which said shaft is journalled, said channels communicating with said bearing assemblies.

5. The engine of claim 4 in which said channels are enlarged about said shaft.

6. The engine of claim 1 in which said exhaust port is of the manifold type including a large port and smaller passages extending from said large port to the oval surface of said block.

7. The engine of claim 1 together with a gear driveably mounted on said shaft externally of said casing, a pinion meshing with said gear, and a starter motor having a drive shaft carrying said pinion.

8. The engine of claim 1 in which said intake port is Y shaped with the legs of the Y communicate with said channels.

9. In a rotary vane internal combustion engine,
   a. a casing comprising a pair of side walls with an engine block clamped therebetween, said walls having flat inner faces and said block being formed with an opening of oval configuration which together with said inner faces define a rotor chamber;
   b. a shaft journalled in said side walls centrally of said rotor chamber;
   c. a rotor keyed to said shaft and rotatable in one direction when power is generated by said engine, said rotor having flat side faces slidably engaging the inner faces of said side walls and a cylindrical surface;
   d. a plurality of radial slots in said rotor which are angularly spaced and open onto said cylindrical surface, each of said slots having flat side faces and a bottom;
   e. a vane slidable in each of said slots;
   f. a plurality of combustion chambers formed in said rotor and corresponding in number to the number of slots formed in said rotor between the side faces of the rotor with each combustion chamber being disposed between a pair of adjacent slots and opening onto said cylindrical surface, each of said combustion chambers having an end surface and an inclined bottom terminating at said cylindrical surface, said end surface being disposed forwardly of the end of the inclined bottom and adjacent to a slot;
   g. an intake port for gaseous fuel in said block communicating with said rotor chamber at a space outside of said rotor;
   h. an exhaust port angularly spaced from said intake port in advance thereof;
   i. a spark plug on said block and including electrodes exposed to said rotor chamber;
   j. contacts connected to said spark plug, and
   k. a cam drivably mounted on said shaft in operative relation to said contacts, each of said vanes, said oval surface of said block and said cylindrical surface of said rotor cooperating to provide maximum compression of said fuel in said combustion chambers immediately before a combustion chamber arrives at said spark plug, whereby ignition of said fuel causes the expanding gases to react between the block and an end surface of a combustion chamber to impart rotation to the rotor with a high degree of efficiency.

* * * * *